United States Patent
Yoo et al.

(10) Patent No.: US 8,902,188 B2
(45) Date of Patent: Dec. 2, 2014

(54) DIGITIZER

(71) Applicant: Samsung Electro-Mechanics Co., Ltd., Suwon (KR)

(72) Inventors: Dong Sik Yoo, Suwon (KR); Kyoung Soo Chae, Suwon (KR); Ho Joon Park, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/773,061

(22) Filed: Feb. 21, 2013

(65) Prior Publication Data

US 2013/0249871 A1    Sep. 26, 2013

(30) Foreign Application Priority Data

Mar. 23, 2012  (KR) .................. 10-2012-0030034

(51) Int. Cl.
*G06F 3/041* (2006.01)
*G06F 3/046* (2006.01)
*G06F 3/0354* (2013.01)

(52) U.S. Cl.
CPC ............ *G06F 3/03545* (2013.01); *G06F 3/046* (2013.01)

USPC ........................................... 345/173; 345/179

(58) Field of Classification Search
None
See application file for complete search history.

(56) References Cited

U.S. PATENT DOCUMENTS

| | | | | |
|---|---|---|---|---|
| 4,697,244 | A * | 9/1987 | Murakami et al. | 345/173 |
| 5,120,907 | A * | 6/1992 | Shinbori et al. | 178/18.07 |
| 5,214,427 | A * | 5/1993 | Yano | 341/20 |
| 7,423,629 | B2 * | 9/2008 | Oda et al. | 345/156 |
| 7,812,268 | B2 * | 10/2010 | Ely | 178/18.03 |
| 7,875,814 | B2 * | 1/2011 | Chen et al. | 178/18.07 |
| 8,674,967 | B2 * | 3/2014 | Fukushima et al. | 345/179 |
| 2004/0223089 | A1 | 11/2004 | Hong et al. | |

* cited by examiner

*Primary Examiner* — Jason Olson
(74) *Attorney, Agent, or Firm* — Ladas & Parry, LLP

(57) ABSTRACT

Disclosed herein is a digitizer, including: an input unit in which a magnet is embedded; a driving coil in which source supplies to induce a line of magnetic force; a sensing coil in which voltage or current is induced by the line of magnetic force; and a controlling unit supplying the source to the driving coil and measuring the voltage or the current induced in the sensing coil, wherein the controlling unit senses a change amount in the voltage or the current induced in the sensing coil to calculate a coordinate, when the voltage or the current induced in the sensing coil is changed by the magnet.

11 Claims, 5 Drawing Sheets

DIGITIZER

CROSS REFERENCE TO RELATED APPLICATION

This application claims the benefit of Korean Patent Application No. 10-2012-0030034, filed on Mar. 23, 2012, entitled "Digitizer", which is hereby incorporated by reference in its entirety into this application.

BACKGROUND OF THE INVENTION

1. Technical Field

The present invention relates to a digitizer.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has widened the use of computers more and more, it is difficult to efficiently operate products using only a keyboard and a mouse currently serving as an input device. Therefore, the necessity for a device that is simple, has minimum malfunction, and is capable of easily inputting information has increased.

In addition, current techniques for the input devices have progressed toward techniques related to high reliability, durability, innovation, designing and processing beyond a level of satisfying general functions. To this end, an electromagnetic induction type digitizer has been developed as an input device capable of inputting information such as text, graphics, or the like.

There is a capacitive touch screen as an input device capable of performing a function similar to that of the electromagnetic induction type digitizer. However, the capacitive touch screen may neither sense an accurate coordinate nor recognize writing pressure, as compared to the electromagnetic induction type digitizer. Therefore, the electromagnetic induction type digitizer is more advantageous in view of precision or accuracy than the capacitive touch screen.

However, as disclosed in the following Prior Art Document, a digitizer according to the prior art requires a pen for the digitizer, which should include a coil receiving a magnetic field to generate current and regenerate a magnetic field using the current and a capacitor charged and discharged with the current generated in the coil. Therefore, in the digitizer according to the prior art, the pen for the digitizer is heavy and thick, such that it is inconvenient to use the digitizer and it is difficult to embed the digitizer in a mobile device.

PRIOR ART DOCUMENT

Patent Document (Patent Document 1) US2004-0223089 A1

SUMMARY OF THE INVENTION

The present invention has been made in an effort to provide a digitizer capable of calculating a coordinate in spite of using a stylus pen (an input unit) that does not require a complicated internal component such as a coil, a capacitor, or the like.

According to a first preferred embodiment of the present invention, there is provided a digitizer, including: an input unit in which a magnet is embedded; a driving coil in which source supplies to induce a line of magnetic force; a sensing coil in which voltage or current is induced by the line of magnetic force; and a controlling unit supplying the source to the driving coil and measuring the voltage or the current induced in the sensing coil, wherein the controlling unit senses a change amount in the voltage or the current induced in the sensing coil to calculate a coordinate, when the voltage or the current induced in the sensing coil is changed by the magnet.

The input unit may be a stylus pen.

The magnet embedded in the input unit may be a permanent magnet.

A direction of a line of magnetic force of the magnet embedded in the input unit and a direction of the line of magnetic force induced in the driving coil may be opposite to each other.

The source supplied to the driving coil by the controlling unit may be an alternate current.

The driving coil and the sensing coil may vertically intersect with each other.

The plurality of driving coils may be provided so as to be in parallel with each other in a first axis direction, and the plurality of sensing coils may be provided so as to be in parallel with each other in a second axis direction vertical to the first axis direction.

The controlling unit may sequentially supply the source to the plurality of driving coils in the second axis direction to sequentially induce the lines of magnetic force in the driving coils in the second axis direction.

The controlling unit may sequentially measure the voltages or the currents induced in the plurality of sensing coils in the first axis direction.

The controlling unit may set the voltage or the current induced in the sensing coil to a reference value before the voltage or the current induced in the sensing coil is changed by the magnet, and compare the changed voltage or the changed current with the reference value to sense the change amount in the voltage or the current induced in the sensing coil, when the voltage or the current induced in the sensing coil is changed by the magnet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
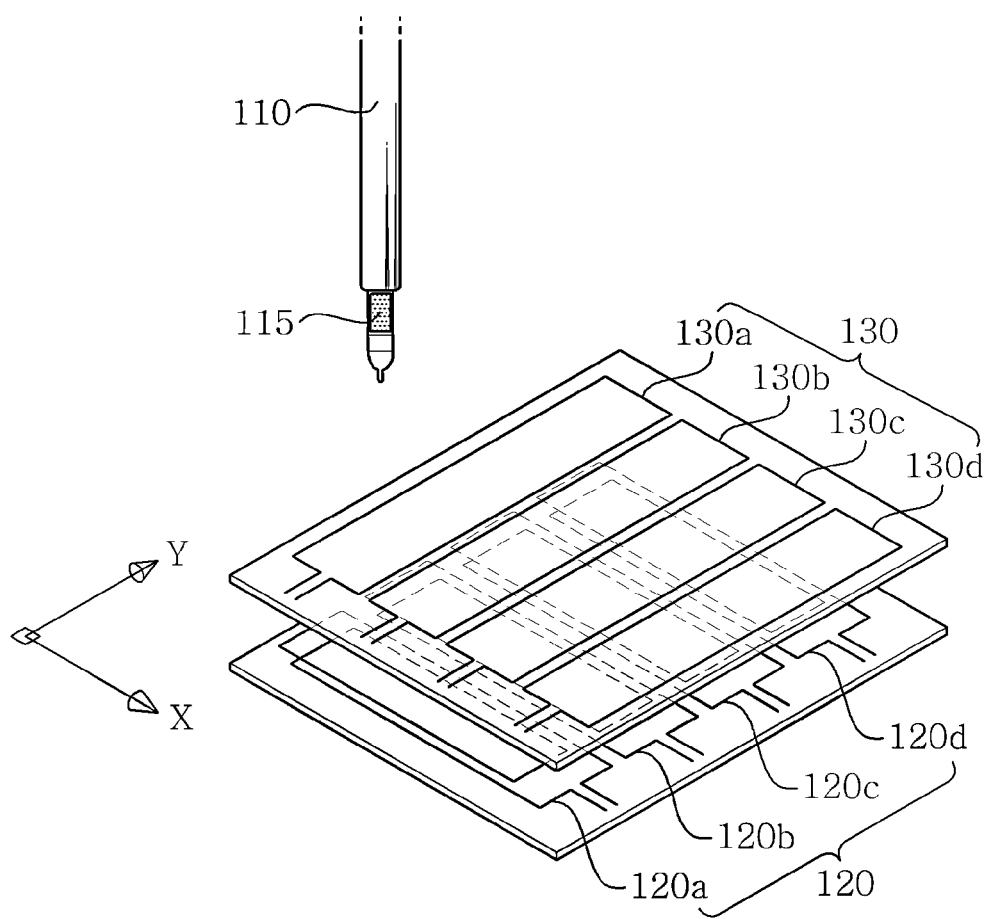
FIG. 1 is a view showing a digitizer according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a view showing a digitizer according to a preferred embodiment of the present invention.

As shown in FIG. 1, the digitizer according to the preferred embodiment of the present invention is configured to include an input unit 110 in which a magnet 115 is embedded, a driving coil 120 in which source supplies to induce a line of magnetic force, a sensing coil 130 in which voltage or current is induced by the line of magnetic force, and a controlling unit supplying the source to the driving coil 120 and measuring the voltage or the current induced in the sensing coil 130. Here, the controlling unit senses a change amount in the voltage or the current induced in the sensing coil 130 to calculate a coordinate, when the voltage or the current induced in the sensing coil 130 is changed by the magnet 115.

The input unit 110 may be, for example, a stylus pen, and serves to indicate the coordinate. Here, the input unit 100 is embedded with a magnet 115 that may be a permanent magnet. In the digitizer according to the prior art, the input unit 110 is embedded with a completed internal component such as a coil, a capacitor, or the like. On the other hand, in the digitizer according to the preferred embodiment of the present invention, the input unit 110 is embedded with the magnet 115. Therefore, in the digitizer according to the preferred embodiment of the present invention, the input unit 110 may be lightly and thinly manufactured. As described above, the input unit 110 may be embedded with the magnet 115 to indicate a coordinate using a line of magnetic force generated in the magnet 115. A detailed process of indicating the coordinate using the line of magnetic force of the magnet 115 will be described below.

The driving coil 120 serves to supply the line of magnetic force to the sensing coil 130. Specifically, since the driving coil 120 is formed in a closed curve type, when source is received in the driving coil 120 from the controlling unit to flow therein, the line of magnetic force is induced toward the sensing coil 130. As described above, the line of magnetic force induced in the driving coil 120 serves to induce the voltage or the current in the sensing coil 130. The voltage or the current (induced electromotive force) induced in the sensing coil 130 is in proportion to a change amount in the line of magnetic force induced in the driving coil 120 according to a time. Therefore, the line of magnetic force induced in the driving coil 120 needs to be periodically changed in order to induce the voltage or the current in the sensing coil 130. Consequently, the driving coil 120 receives alternate current (AC) from the controlling unit so that the induced line of magnetic force is periodically changed.

The sensing coil 130 serves to allow the controlling unit to calculate the coordinate through the induced voltage or current. Specifically, the sensing coil 130 induces the voltage or the current (the induced electromotive force) by the line of magnetic force induced in the driving coil 120. In the case in which the magnet 115 embedded in the input unit 110 approaches the sensing coil 130, the voltage or the current induced in the sensing coil 130 is changed by the line of magnetic force of the magnet 115. The controlling unit may sense the coordinate through the change amount in the voltage or the current.

Meanwhile, the driving coil 120 and the sensing coil 130 may be formed so as to vertically intersect with each other in order to calculate an XY coordinate. Specifically, a plurality of the driving coils 120 may be provided so as to be in parallel with each other in a first axis direction (an X axis direction), and a plurality of the sensing coils 130 may be provided so as to be in parallel with each other in a second axis direction (a Y axis direction) vertical to the first axis direction (the X axis direction) However, the driving coils 120 and the sensing coils 130 do not necessarily vertically intersect with each other in all portions, but vertically intersect with each other in at least one portion.

The controlling unit serves to supply the source to the driving coil 120 and measure the voltage or the current induced in the sensing coil 130. Specifically, the controlling unit supplies the source so that the line of magnetic force is induced in the driving coil 120 and measures the voltage or the current induced in the sensing coil 130 by the line of magnetic force. In addition, when the magnet 115 embedded in the input unit 110 approaches the sensing coil 130, the line of magnetic force induced in the driving coil 120 is distorted by the line of magnetic force of the magnet 115 to change the voltage or the current induced in the sensing coil 130. At this time, the controlling unit senses the change amount in the voltage or the current induced in the sensing coil 130 to calculate the coordinate. Meanwhile, in order to certainly distort the line of magnetic force induced in the driving coil 120 by the line of magnetic force of the magnet 115 embedded in the input unit 110, a direction of the line of magnetic force of the magnet 115 embedded in the input unit 110 and a direction of the line of magnetic force induced in the driving coil 120 may be opposite to each other.

In addition, the controlling unit may supply the source to the driving coil 120 through time division and measure the voltage or the current induced in the sensing coil 130. For example, in the case in which the plurality of driving coils 120 are provided so as to be in parallel with each other in the first axis direction (the X axis direction), the controlling unit may sequentially supply the source to a first driving coil 120a, a second driving coil 120b, a third driving coil 120c, and a fourth driving coil 120d in the second axis direction (the Y axis direction) to sequentially induce the line of magnetic force in the first driving coil 120a, the second driving coil 120b, the third driving coil 120c, and the fourth driving coil 120d. In addition, in the case in which the plurality of sensing coils 130 are provided so as to be in parallel with each other in the second axis direction (the Y axis direction), the controlling unit may sequentially measure voltages or currents induced in a first sensing coil 130a, a second sensing coil 130b, a third sensing coil 130c, and a fourth sensing coil 130d in the first axis direction (the X axis direction).

FIGS. 2 to 7 are views showing an operating process of the digitizer according to the preferred embodiment of the present invention. The operating process of the digitizer will be described in detail with reference to FIGS. 2 to 7.

As shown in FIGS. 2 to 7, a configuration in which four driving coils 120 are provided so as to be in parallel with each other in the first axis direction (the X axis direction) and four sensing coils 130 are provided so as to be in parallel with each other in the second direction (the Y axis direction) will be described. Meanwhile, this configuration is only an example for convenience of explanation, and the present invention is not limited thereto.

Figure 2:
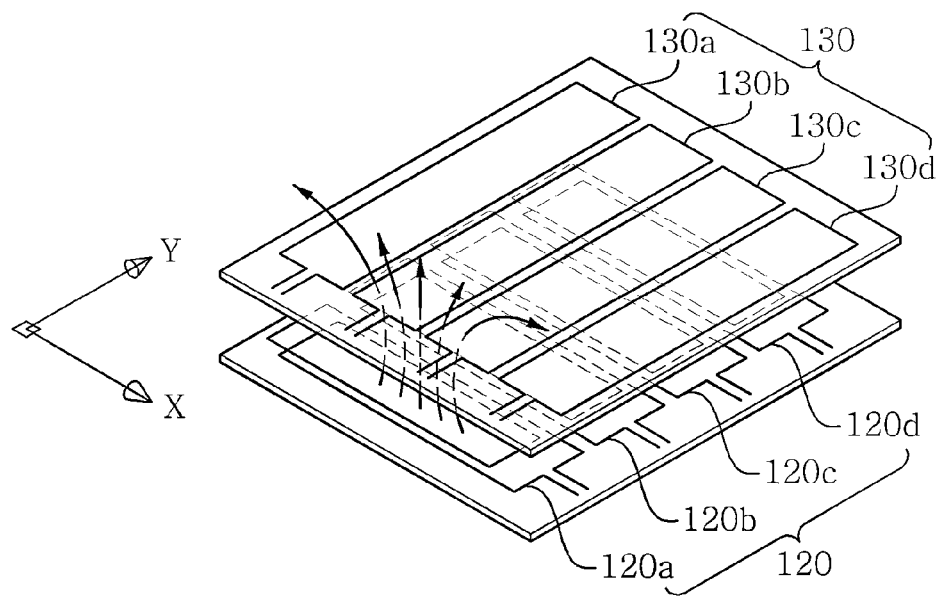
FIGS. 2 to 7 are views showing an operating process of the digitizer according to the preferred embodiment of the present invention.

First, as shown in FIG. 2, the controlling unit supplies the source to the first driving coil 120a first provided in the second axis direction (the Y axis direction) among the four driving coils 120 to induce the line of magnetic force in the first driving coil 120a. The voltages or the currents are induced in the four sensing coils 130 by this line of magnetic force. The voltages or the currents induced in the four sensing coils 130 are constant because of a state before the voltages or the currents are affected by the magnet 115 embedded in the input unit 110. In this case, the controlling unit sequentially calculates the voltages or the currents induced in the four sensing coils 130 in the first axis direction (the X axis direction) to set the induced voltages or currents to a first reference value. That is, the controlling unit sequentially measures the voltages or the currents induced in the first sensing coil 130a, the second sensing coil 130b, the third sensing coil 130c, and the fourth sensing coil 130d to set the voltages or the currents induced in the four sensing coils 130 to the first reference value.

Figure 3:
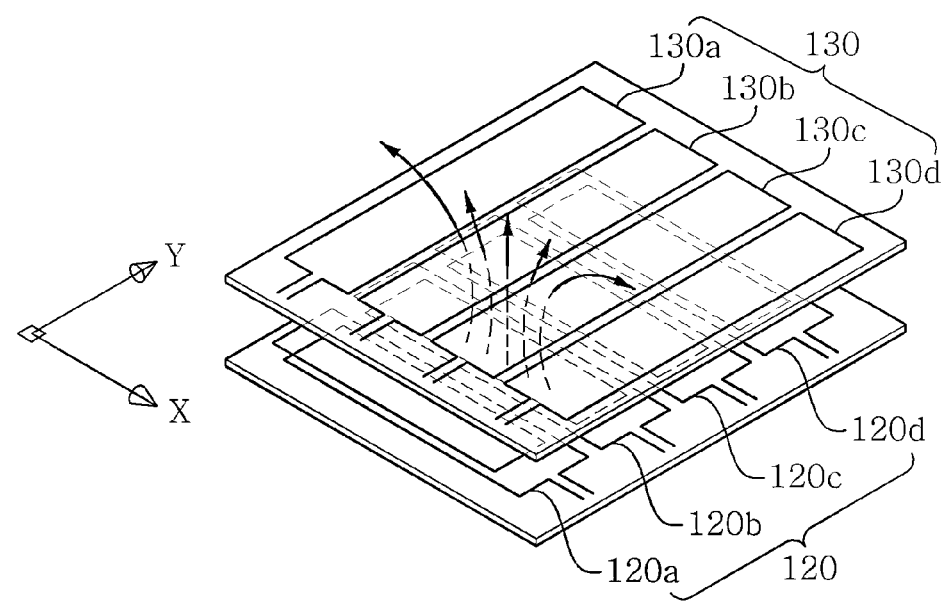

Then, as shown in FIG. 3, the controlling unit supplies the source to the second driving coil 120b to induce the line of magnetic force in the second driving coil 120b. In this case, the controlling unit sequentially measures the voltages or the currents induced in the first sensing coil 130a, the second sensing coil 130b, the third sensing coil 130c, and the fourth sensing coil 130d to set the voltages or the currents induced in the four sensing coils 130 to a second reference value.

Figure 4:
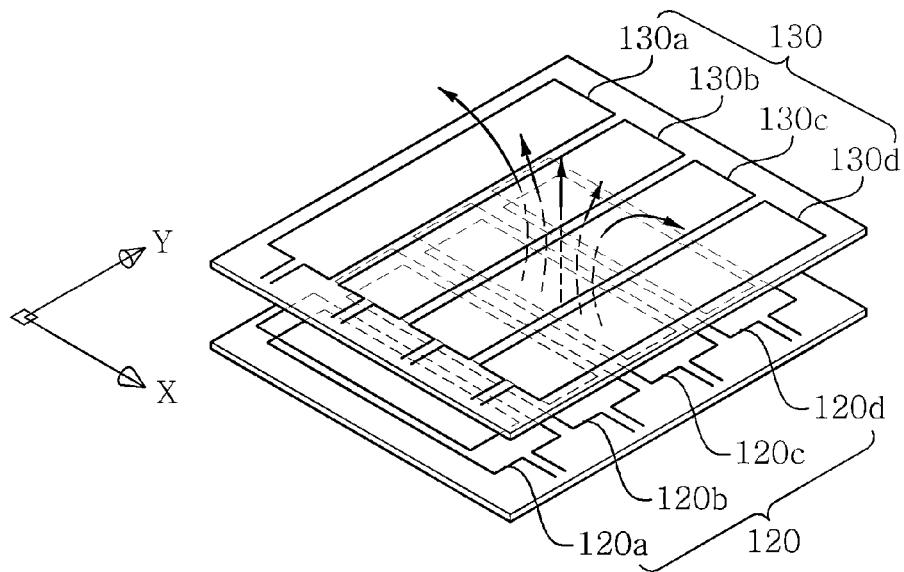

Next, as shown in FIG. 4, the controlling unit supplies the source to the third driving coil 120c to induce the line of magnetic force in the third driving coil 120c. In this case, the controlling unit sequentially measures the voltages or the currents induced in the first sensing coil 130a, the second sensing coil 130b, the third sensing coil 130c, and the fourth sensing coil 130d to set the voltages or the currents induced in the four sensing coils 130 to a third reference value.

Figure 5:
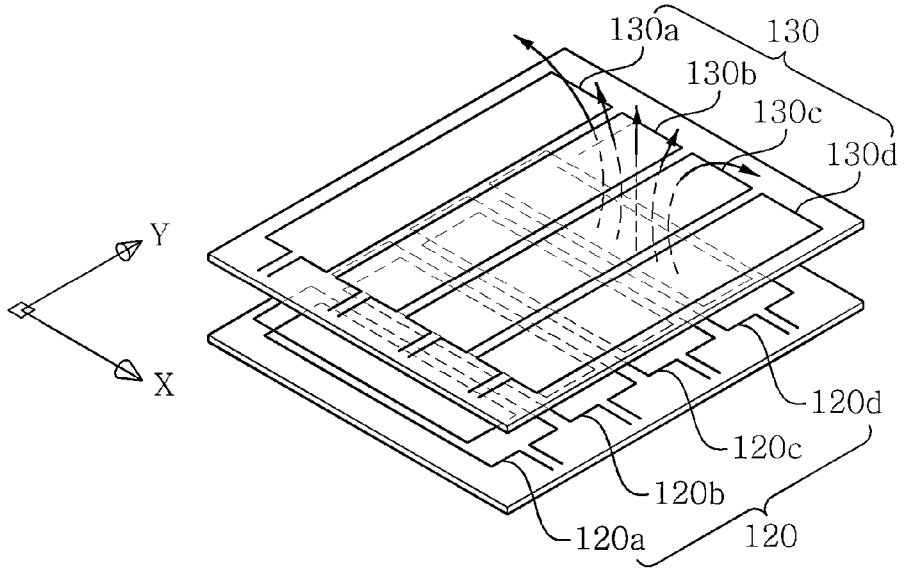

Thereafter, as shown in FIG. 5, the controlling unit supplies the source to the fourth driving coil 120d to induce the line of magnetic force in the fourth driving coil 120d. In this case, the controlling unit sequentially measures the voltages or the currents induced in the first sensing coil 130a, the second sensing coil 130b, the third sensing coil 130c, and the fourth sensing coil 130d to set the voltages or the currents induced in the four sensing coils 130 to a fourth reference value.

As described above, the controlling unit sequentially supplies the source to the first driving coil 120a, the second driving coil 120b, the third driving coil 120c, and the fourth driving coil 120d to set the voltages or the currents induced in each of the sensing coils 130 to the reference value and then sequentially supplies again the source to the first driving coil 120a, the second driving coil 120b, the third driving coil 120c, and the fourth driving coil 120d as described below to calculate the coordinate by the voltages or the currents induced in each of the sensing coils 130.

Figure 6:
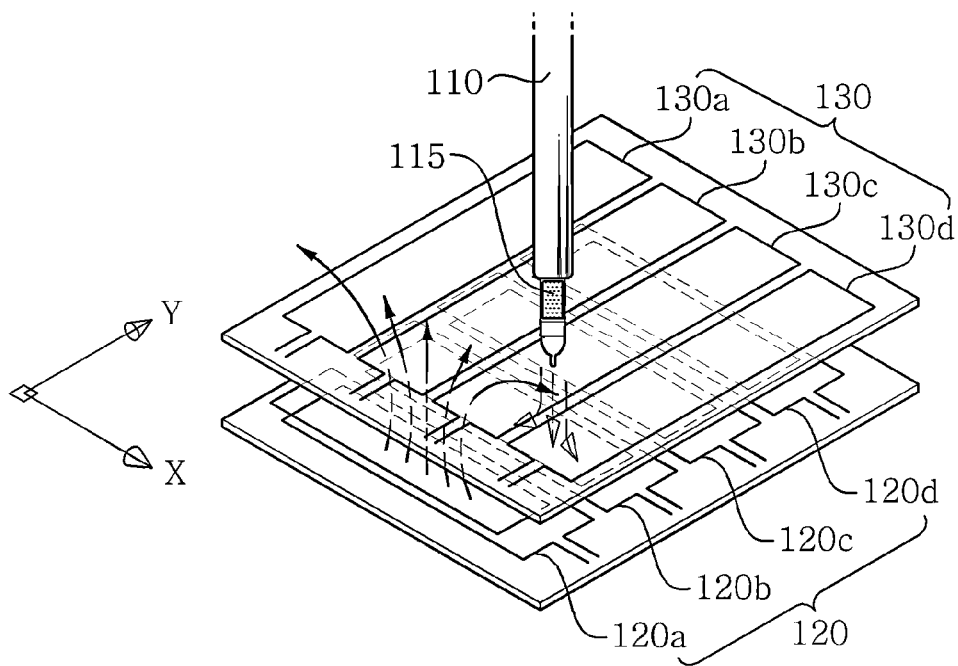

Specifically, as shown in FIG. 6, the controlling unit supplies the source to the first driving coil 120a to induce the line of magnetic force. The voltages or the currents are induced in the four sensing coils 130 by the line of magnetic force. The controlling unit sequentially measures the four voltages or currents induced in the first sensing coil 130a, the second sensing coil 130b, the third sensing coil 130c, and the fourth sensing coil 130d. In this case, since the magnet 115 embedded in the input unit 115 is positioned at an upper portion of the second driving coil 120b to be spaced apart from the first driving coil 120a, the line of magnetic force of the magnet 115 does not significantly distort the line of magnetic force induced in the first driving coil 120a. Therefore, change amounts in the voltages or the currents induced in the four sensing coils 130 are also not large. Consequently, the controlling unit compares the change amounts in the voltages or the currents induced in the four sensing coils 130 with the first reference value described above and determines that the change amount in the voltages or the currents are a predetermined value or less, thereby making it possible to recognize that the input unit 110 is not positioned at an upper portion of the first driving coil 120a.

Figure 7:
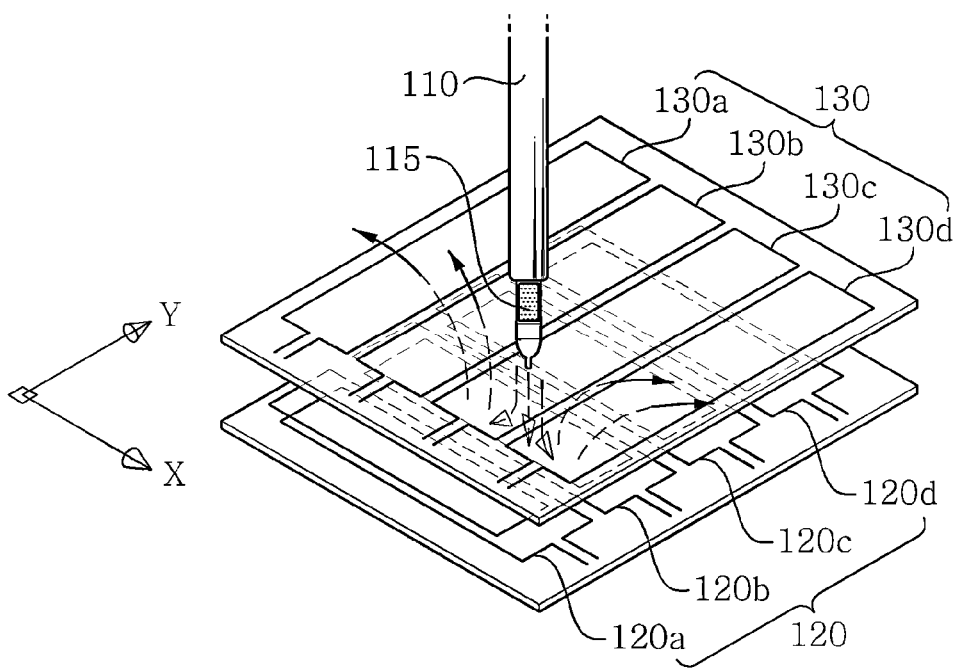
Figure 8:
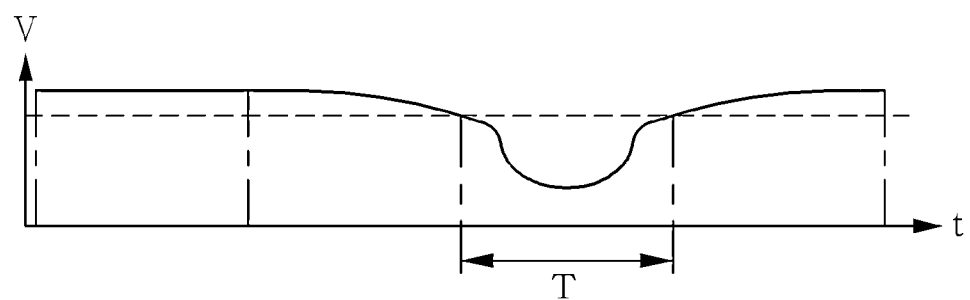
FIG. 8 is a view showing a magnitude of voltage or current induced in a sensing coil according to a time.

Then, as shown in FIG. 7, the controlling unit supplies the source to the second driving coil 120b to induce the line of magnetic force. The voltages or the currents are induced in four sensing coils 130 by the line of magnetic force. The controlling unit sequentially measures the four voltage or current induced in the first sensing coil 130a, the second sensing coil 130b, the third sensing coil 130c, and the fourth sensing coil 130d. In this case, since the magnet 115 embedded in the input unit 110 is positioned at an upper portion of a point at which the second driving coil 120b and the third sensing coil 130c intersect with each other, the line of magnetic force of the magnet 115 significantly distorts the line of magnetic force passing through the third sensing coil 130c in the line of magnetic force induced in the second driving coil 120b (See an arrow in FIG. 7). Therefore, the voltage or the current induced in the third sensing coil 130c among the four sensing coils 130 has the largest change amount. FIG. 8 is a graph showing a magnitude of the voltage or the current induced in the sensing coil according to a time. It may be appreciated from FIG. 8 that a change in the magnitude of the voltage or the current is the largest during a time T in which the controlling unit senses the third sensing coil 130c. For reference, a dotted line shown in FIG. 8 is a value set based on the reference value in order to prevent erroneous sensing due to noise. Consequently, the controlling unit compares the change amount in the voltage or the current induced in the third sensing coil 130c with the second reference value described above and determines that the change amount in the voltage or the current is a predetermined value or more, thereby making it possible to recognize that the input unit 110 is positioned at the upper portion of the point at which the second driving coil 120b and the third sensing coil 130c intersect with each other. In this case, since the second driving coil 120b is secondly provided in the second axis direction (the Y axis direction) and the third sensing coil 130C is thirdly provided in the first axis direction (the X axis direction), the controlling unit may finally calculate the coordinate of the input unit 110 based on this positional information.

Then, the controlling unit may perform a process of inducing the line of magnetic force by supplying the source to the third driving coil 120c and a process of inducing the line of magnetic force by supplying the source to the fourth driving coil 120d. However, since these processes are similar to the process of inducing the line of magnetic force by supplying the source to the first driving coil 120a (See FIG. 6), a description thereof will be omitted.

Meanwhile, although the case in which the driving coil 120 is positioned at a lower side and the sensing coil 130 is positioned at an upper side is shown in the accompanying drawings, the present invention is not limited thereto, but may be variously changed. For example, the driving coil 120 may be positioned at the upper side and the sensing coil 130 may be positioned at the lower side.

As set forth above, according to the preferred embodiment of the present invention, the digitizer including the driving coil in which the line of magnetic force is induced and the sensing coil in which the voltage or the current is induced by the line of magnetic force is used, thereby making it possible to indicate the coordinate even with the stylus pen (the input unit) that does not have a complicated internal component such as a coil, a capacitor, or the like. Therefore, the stylus pen can be lightly and thinly manufactured.

In addition, according to the preferred embodiment of the present invention, the stylus pen is lightly and thinly manufactured, thereby making it possible to conveniently use the digitizer and easily embed the digitizer in the mobile device.

Further, according to the preferred embodiment of the present invention, since the permanent magnet rather than the coil or the capacitor is embedded in the stylus pen, the stylus pen does not need to be supplied with power and may be permanently used.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A digitizer comprising:
    an input unit in which a magnet is embedded;
    a driving coil in which source supplies to induce a line of magnetic force;
    a sensing coil in which voltage or current is induced by the line of magnetic force; and
    a controlling unit supplying the source to the driving coil and measuring the voltage or the current induced in the sensing coil,
    wherein the controlling unit senses a change amount in the voltage or the current induced in the sensing coil to calculate a coordinate, when the voltage or the current induced in the sensing coil is changed by the magnet, and when the magnet embedded in the input unit approaches the sensing coil, the line of magnetic force induced in the driving coil is distorted by a line of magnetic force of the magnet to change the voltage induced in the sensing coil, and
    wherein the driving coil and the sensing coil perpendicularly intersect with each other.

2. The digitizer as set forth in claim 1, wherein the input unit is a stylus pen.

3. The digitizer as set forth in claim 1, wherein the magnet embedded in the input unit is a permanent magnet.

4. The digitizer as set forth in claim 1, wherein a direction of a line of magnetic force of the magnet embedded in the input unit and a direction of the line of magnetic force induced in the driving coil are opposite to each other.

5. The digitizer as set forth in claim 1, wherein the source supplied to the driving coil by the controlling unit is an alternate current.

6. The digitizer as set forth in claim 1, wherein the plurality of driving coils are provided so as to be in parallel with each other in a first axis direction, and the plurality of sensing coils are provided so as to be in parallel with each other in a second axis direction perpendicular to the first axis direction.

7. The digitizer as set forth in claim 6, wherein the controlling unit sequentially supplies the source to the plurality of driving coils in the second axis direction to sequentially induce the lines of magnetic force in the driving coils in the second axis direction.

8. The digitizer as set forth in claim 6, wherein the controlling unit sequentially measures the voltages or the currents induced in the plurality of sensing coils in the first axis direction.

9. The digitizer as set forth in claim 6, wherein the controlling unit sets the voltage or the current induced in the sensing coil to a reference value before the voltage or the current induced in the sensing coil is changed by the magnet, and compares the changed voltage or the changed current with the reference value to sense the change amount in the voltage or the current induced in the sensing coil, when the voltage or the current induced in the sensing coil is changed by the magnet.

10. The digitizer as set forth in claim 1, wherein the input unit does not have the coil and the capacitor.

11. The digitizer as set forth in claim 1, wherein the input unit has the magnet only.

* * * * *